(12) United States Patent
Warden et al.

(10) Patent No.: US 7,322,520 B2
(45) Date of Patent: Jan. 29, 2008

(54) AUTHENTICATION OF MERCHANDISE UNITS

(75) Inventors: Todd Warden, Keene, NH (US); Paul Mills, Newark (GB)

(73) Assignee: Markem Corporation, Keene, NH (US)

( * ) Notice: Subject to any disclaimer, the term of this patent is extended or adjusted under 35 U.S.C. 154(b) by 129 days.

(21) Appl. No.: 11/104,029

(22) Filed: Apr. 12, 2005

(65) Prior Publication Data

US 2006/0226219 A1 Oct. 12, 2006

(51) Int. Cl.
*G06K 15/00* (2006.01)
(52) U.S. Cl. ................ 235/383; 235/375; 235/487
(58) Field of Classification Search ............ 235/487, 235/494, 491, 375, 381, 383, 385
See application file for complete search history.

(56) References Cited

U.S. PATENT DOCUMENTS

| | | | |
|---|---|---|---|
| 6,069,955 A | 5/2000 | Coppersmith et al. | 380/54 |
| 6,226,619 B1 | 5/2001 | Halperin et al. | 705/1 |
| 2004/0099736 A1* | 5/2004 | Neumark | 235/385 |
| 2004/0100380 A1* | 5/2004 | Lindsay et al. | 340/540 |
| 2005/0234778 A1* | 10/2005 | Sperduti et al. | 705/22 |

OTHER PUBLICATIONS

Greengard, Samuel, "RFID: Cure for Counterfeit Drugs," RFID Journal, Oct. 15, 2003.
Juels, Ari, "Strengthening EPC Tags Against Cloning," Proc. 2005 ACM Workshop on Wireless Security, Cologne, Germany, Sep. 2, 2005.
Mohan, Anne Marie, "RFID key to FDA's anti-counterfeit strategy," Packaging Digest, Jun. 2004, p. 54.
Weekly, David E., "Steganographic Encoding of Information Using a Non-Deterministic Finite State Automaton," Unknown publication, date of publication believed to be on or around Sep. 13, 2002.
Won Tesoriero, Healther, "Radio ID Tags Will Help Monitor Drug Supplies," The Wall Street Journal Online, Nov. 16, 2004, p. D9.

* cited by examiner

*Primary Examiner*—Karl D. Frech
(74) *Attorney, Agent, or Firm*—Fish & Richardson P.C.

(57) ABSTRACT

A system for authenticating a merchandise unit includes a memory for storing an electronic product code obtained from and identifying the merchandise unit, and a sensor for detecting an attribute of a marking medium associated with the merchandise unit. The system is configured to output data representative of the attribute and the identity of the merchandise unit.

36 Claims, 2 Drawing Sheets

AUTHENTICATION OF MERCHANDISE UNITS

FIELD OF INVENTION

The invention relates to the authentication of merchandise units, and in particular, to authentication of merchandise units identified by serial numbers.

BACKGROUND

Serial numbers, such as the electronic product code, can be used to identify particular units of merchandise. These numbers can be used to track the location of a merchandise unit and to trace the origin and history of a particular unit as it travels from one stop to the next along a supply chain. The ability to do so is useful because it enables one to identify specific manufacturing lots that may correspond to tainted or defective goods. Other units with the same or similar history can be then be traced and recalled as needed.

At each stop in the supply chain, it may be desirable to establish the authenticity of a merchandise unit. In such cases, a serial number is of little value. A serial number, whether it is encoded in a bar code or printed directly on a package, can easily be copied. Inspection of a serial number provides limited basis for distinguishing counterfeit goods from authentic goods. At best, one may recognize that the serial number is syntactically incorrect, perhaps by recognizing that the number of characters is incorrect, or that letters are present where numbers should be and vice versa. However, a skilled counterfeiter is unlikely to make such errors.

In some cases, the serial number is not even visible. For example, the serial number may be encoded in an RFID tag. In these cases, one must rely on the availability of a reader to read the serial number. However, having read a serial number from an RFID, one encounters the same problem: it is difficult to tell from the serial number alone if the merchandise unit is authentic. A skilled counterfeiter can readily encode a syntactically correct serial number onto an RFID tag just as he can print a syntactically correct serial number on a package.

SUMMARY

In one aspect, the invention includes a system for authenticating a merchandise unit. Such a system include a memory for storing an electronic product code obtained from the merchandise unit. This electronic product code identifies the merchandise unit. The system also includes a sensor for detecting an attribute of a marking medium associated with the merchandise unit. The system is configured to output data representative of the attribute and the identity of the merchandise unit.

Some embodiments also include a processor for determining whether the attribute corresponds to the electronic product code or whether the attribute corresponds to a range that includes the electronic product code.

A variety of sensor types can be used. Exemplary sensor types include fluorescence detectors and sensors configured to detect a physical property of a nucleic acid sequence.

In other embodiments, the system also includes a reader configured to read the electronic product code from the merchandise unit. Examples of suitable readers include RFID tag readers and bar code scanners.

In another aspect, the invention includes a merchandise unit having both a mark encoding an electronic product code that identifies the merchandise unit, and a marking medium having an attribute that corresponds to the electronic product code.

Exemplary marks include marks in which information is encoded as a bar code, and marks in which information is encoded in an RFID tag.

Embodiments include those in which the marking medium is a fluorescent material, and those in which the marking medium is a nucleic acid sequence.

In some embodiments, the marking medium is associated with packaging of the unit. However, in others, the marking medium is associated with labeling of the unit. In still others, the marking medium is associated with a product associated with the unit.

The invention also includes a methods for evaluating authenticity of a merchandise unit. One such method includes reading an electronic product code from the merchandise unit, measuring a value of an attribute associated with the merchandise unit, and determining whether the value corresponds to the electronic product code.

In some practices, reading an electronic product code includes reading a bar code.

Other practices include those in which measuring a value includes observing a fluorescence, and those in which measuring a value includes observing a property of a nucleic acid sequence.

In some practices of the invention, determining whether the value of the attribute corresponds to the electronic product code includes determining whether the electronic product code is within a range of permissible electronic product codes.

An additional aspect of the invention is a marking system for marking merchandise units. Such a marking system includes a marking station having a serial number applicator for associating an electronic product code with a merchandise unit; and a marking medium applicator for associating a marking medium with the merchandise unit. The marking medium has an attribute that corresponds to the electronic product code associated with the merchandise unit.

In some embodiments, the system also includes a processing system in data communication with the marking station. For each merchandise unit marked by the marking station, the processing system stores data indicative of a relationship between the attribute value and the electronic product code.

Embodiments of the invention include those in which the serial number applicator includes an RFID programming unit, as well as those in which the serial number applicator includes an ink jet printer.

Other embodiments include those in which the marking medium applicator is configured to associate a fluorescent material with a merchandise unit, and those in which, the marking medium applicator is configured to associate a nucleic acid sequence with a merchandise unit.

In some embodiments, the processing system is in data communication with the marking medium applicator over a wide area network.

In another aspect, the invention includes a methods for marking a merchandise unit. Such methods include associating an electronic product code with a merchandise unit, and associating a marking medium with the merchandise unit. The marking medium has an attribute that corresponds to the electronic product code associated with the merchandise unit. Such methods further include storing, for each merchandise unit marked by the marking station, data indicative of a relationship between the attribute value and the electronic product code.

Alternative practices of the invention include those in which associating an electronic product code with a merchandise unit includes encoding the code in an RFID tag, and those in which associating an electronic product code with a merchandise unit includes printing the electronic product code on the merchandise unit.

Additional practices of the invention include those in which associating a marking medium with the merchandise unit includes associating a fluorescent material with a merchandise unit, and those in which associating a marking medium with the merchandise unit includes associating a nucleic acid sequence with a merchandise unit.

In some practices of the invention storing data includes transmitting the data to a storage location over a wide area network.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and the accompanying figures, in which:

DETAILED DESCRIPTION

Figure 1:
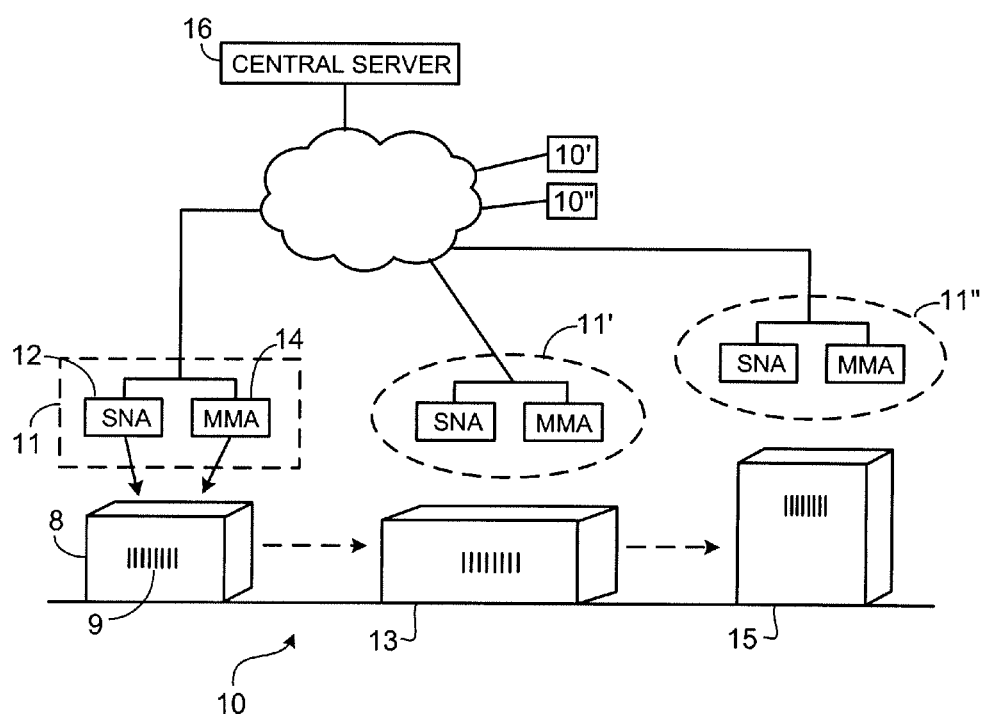
FIG. 1 is a representation of a supply chain.

A merchandise unit 8, as shown in FIG. 1, can be identified by a serial number 9, such as an electronic product code. An electronic product code associated with a merchandise unit 8 can be programmed into an RFID (radio frequency identification) tag, printed on a bar code, or printed in human-readable form on a package or label associated with the merchandise unit 8. The merchandise unit 8 includes a product and, optionally, labeling identifying the product and packaging to protect the product.

Marking Media

Integrated into the merchandise unit 8, either in the product itself, or in its associated packaging and/or label if any, is a marking medium having an attribute selected to depend, to some extent, on the serial number. The marking medium may or may not be visible to the naked eye. However, the relationship between the marking medium and the serial number 9 associated with the merchandise unit 8 is not readily ascertainable from examination of either the merchandise unit 8, the marking medium, or the serial number 9.

As used herein, an "attribute" of the marking medium refers to an observable physical property associated with the marking medium that is related to a serial number associated with a merchandise unit. The marking medium can thus be viewed as a steganographic feature associated with the merchandise unit 8, with the message provided by that steganographic feature being a message encoded in a value of the attribute. The content of the message includes information about the serial number associated with the merchandise unit 8. The marking medium can also be viewed as a watermark, with the nature of the watermark being dependent on the serial number associated with the product.

The correspondence between the attributes of a marking medium and the serial number need not be a one-to-one correspondence. In some applications, it may be sufficient for the value of an attribute to identify a manufacturing lot associated with a serial number. In general, a value of an attribute of a marking medium can correspond to a single serial number, or to a set of serial numbers. Such a set can be one in which the serial numbers are sequential, i.e. a "range" of serial numbers, or the set can be one in which the serial numbers are arbitrarily selected, so that no readily discernible pattern is observed in the serial numbers belonging to the set. To the extent that the relationship is secret, counterfeiters are more likely to be thwarted.

One example of a marking medium is a dye. For example, a dye corresponding to a first set of serial numbers may fluoresce at a first set of wavelengths, while a dye corresponding to a second set of serial numbers may fluoresce at a second set of wavelengths that is distinct from the first set. In this case, the attribute is a spectrum, and information about the serial numbers of the merchandise unit 8 is encoded as a pattern of spectral lines, which in this case is the "value" of that attribute.

Another example of a marking medium is a polarizing substance, i.e. one that alters a polarization state of light passing through it. In such a case, a range of polarization angular rotations may correspond to a range of serial numbers. The attribute would then be the polarization vector of the medium, and information about the serial numbers 8 associated with the merchandise unit would be encoded as specific values of a polarization angle.

Another example of a marking medium is a substance that alters an index of refraction. In such a case, a wave passing through the substance can be deflected by an angle that depends on serial number. Alternatively, a wave passing through the substance can be made to experience a phase delay that depends on serial number. In this case, the attribute is the refractive index, and the value is a deflection angle.

Alternatively, one can measure a reflection coefficient, a transmission coefficient, or a standing wave ratio that is made to depend on serial number by varying the impedance (and hence the index of refraction) of the medium. All of these attributes can thus be used to encode information indicative of a serial number associated with the merchandise unit 8.

Another example of a marking medium is a radioactive substance. In such a case, the attribute is a decay rate or other radiation related parameter that provides independent confirmation of a serial number. One way to achieve this is to vary the ratio of radioactive isotopes as a function of serial number or sets of serial numbers.

Another example of a marking medium is a nucleic acid sequence, such as DNA, in which the pattern of nucleic acids is the attribute. Particular patterns, which are related to the serial number, are the "values" of that attribute.

A marking medium can be an integral part of the product's composition. For example, in the case of a liquid product, or a product that was once in molten form, the marking medium can be another liquid having suitable measurable attributes. This liquid can then be mixed into the product so that it becomes integral with and inseparable from the product. Exemplary products into which a marking medium can be integrated in this manner include room-temperature liquids, plastic articles or articles having plastic parts, and alloys.

Alternatively, the marking medium can integrated into either the labeling or the packaging of the product. For example, a label may be printed with an ink that includes, as one of its constituents, a marking medium such as those described above. Or, a product may be packaged in glass or plastic containers in which the marking medium is embedded in the container itself. For example, merchandise units bearing one range of serial numbers may be packaged in plastic containers that absorb a first wavelength, whereas merchandise units bearing another range of serial numbers may be packaged in plastic containers that absorb a second wavelength.

Marking the Merchandise Unit

The marking medium is best integrated into the merchandise unit 8 concurrently with, or substantially concurrently with, the application of a serial number 9, whether the serial number is printed on the merchandise unit or encoded in an RFID tag that is then affixed to the merchandise unit 8. This ensures that the merchandise unit 8 is uniquely identified from its inception at the beginning of a supply chain 10.

To carry out this integration, the supply chain 10 features a marking station 11 having a serial number applicator 12. The serial number applicator 12 ("SNA" in the figure) can include an ink jet printer for printing a serial number, or it can include an RFID tag applicator, or both.

The marking station 11 also includes a marking medium applicator 14 ("MMA" in the figure) that is in data communication with the serial number applicator 12. The particular implementation of the marking medium applicator 14 depend on the particular marking medium. For example, if the marking medium is integrated into the glass or plastic that comprises a container, the marking medium applicator 14 includes a supply of empty containers of various types, and a mechanism for selecting a container and filling it with the product. The selection of the container is made on the basis of data provided by the serial number applicator 12. This communication between the marking medium applicator 14 and the serial number applicator 12 ensures the correct relationship between the attributes of the marking medium and the serial number 9.

The supply chain 10 can have several marking stations 11 at which a serial number applicator 12 and a marking medium applicator 14 cooperate in the manner described above. For example, one marking station 11 may be used to mark individual units at the beginning of the supply chain 10. Another marking station 11' can be placed further down the supply chain to mark boxes 13 into which the individual merchandise units are to be packaged. Yet another marking station 11' can be placed further down the supply chain 10 to mark palettes 15 into which the boxes are to be loaded. Each of the marking stations 11, 11', 11" is in communication with a central server 16 over a network 18 so that data indicative of a location of a particular merchandise unit 9 can constantly be updated on the central server 18.

Note that boxes 13 and palettes 15 are, from the point of view of their respective marking stations 11', 11" also "merchandise units." A "merchandise unit" is a purely logical construct to indicate what is being marked for identification.

Data Management

The authentication process includes inspecting the serial number on a merchandise unit 9, measuring the value of an attribute, and determining if the value of the attribute and the serial number have an appropriate relationship. Thus, to facilitate the authentication process, the relationship between a measured attribute of the marking medium and the serial number can be made available.

In one embodiment, the central server 16, which executes supply-chain management software, is in data communication with one or more supply chains 10', 10", each having one or more marking stations 11 as described above. The central server 16 can be remotely linked to the supply chains 10, 10', 10", for example over the network 18. The network 18 can be a wide area network, or a global network such as the internet. Or, the central server 16 can be local to a single supply chain 10. As merchandise units 8 are marked, the supply-chain management software receives, from the marking stations 11, data indicative of both the serial number 9 and the attribute of the marking medium. This data is then stored at the central server 16 or at a remote storage facility. Exemplary supply-chain management software includes that made available under the name "COLOS" by Markem Corporation of Keene, N.H.

The relationship between serial number 9 and attribute can be made arbitrary, with no particular algorithm relating the serial number 9 to the attribute. This method provides considerable security since even if the counterfeiter knew that there existed a relationship between a serial number 9 and an attribute value, it would be difficult to discern the particular relationship between them. In other cases, a function relates the serial number 9 to the attribute value or vice versa. In those cases, an algorithm to obtain the attribute value from the serial number 9 or vice versa can be stored on the central server 16, so that one or the other can be computed whenever required. This method saves storage space at the expense of both computation time and security.

Authentication Unit

Figure 2:
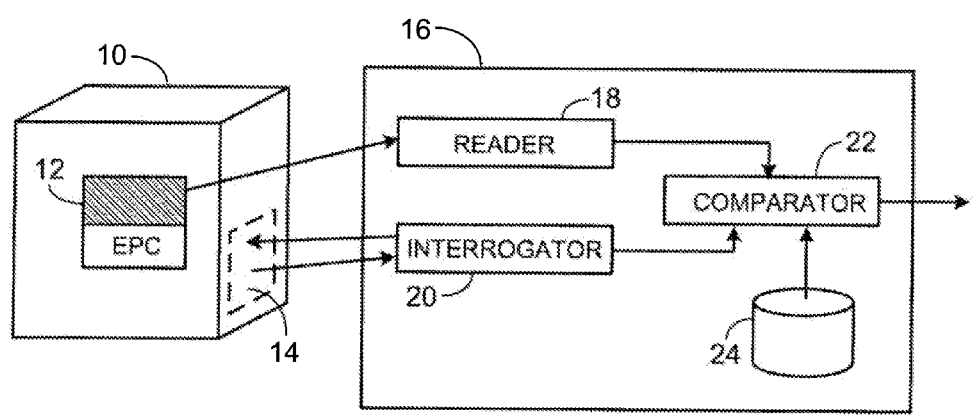
FIG. 2 is a merchandise authenticator for use in the supply chain.

To authenticate a merchandise unit 8, one provides the serial number to an authentication unit 22, as shown in FIG. 2. In some embodiments, the authentication unit 22 includes a reader 24 for reading a serial number from an RFID tag. The reader 24 can be a bar code scanner, an RFID reader, or any other reader. Alternatively, the serial number can be provided to the reader 24 by a human operator.

The authentication unit 22 also includes an interrogator 26 for inspecting the marking medium. The details of the interrogator 26, like those of the marking medium applicator 14, depend on the particular type of marking medium. The interrogator 26 can be an active interrogator that provides a stimulus to the marking medium and observes a response to that stimulus. Alternatively, the interrogator 26 can be a passive interrogator that observes a response of the marking medium to ambient conditions.

The detailed structure of the interrogator 26 will depend on the nature of the marking medium. For example, if the marking medium is a fluorescent ink that is used somewhere on the packaging or label, or a dye that is introduced into the product itself, the interrogator 26 may include a spectrometer. Or, in the case in which the marking medium is a radioactive material, the interrogator 26 will include a radiation detector. Or, if the marking medium relies on nucleic acid sequences, the interrogator can implement an appropriate test to identify the sequence.

The interrogator 26 measures the attribute associated with the marking medium and provides that information to a comparator 28. Meanwhile, the reader 24 provides the serial number to the comparator 28. The comparator 28 then determines whether the serial number and the response correspond to each other. If they do, the comparator 28 outputs a signal indicating that the merchandise unit 8 appears to be genuine. Otherwise, the comparator 28 outputs a signal indicating that the merchandise unit 8 appears to be a counterfeit. In either case, a human operator would encounter difficulty ascertaining a relationship between the serial number 8 and the attributes of the marking medium. As a result, it is difficult to effectively counterfeit the merchandise unit 8.

Once a merchandise unit 8 is marked as described herein, with both a serial number 9 and a marking medium having an attribute that corresponds to the serial number 9, counterfeiting becomes more difficult. No longer can the counterfeiter expect to deceive by simply copying a serial number 9. Instead, the counterfeiter would be led to incorporate, into the merchandise unit 8, a marking medium having a physical attribute that corresponds to the serial number 9. Since the relationship between the serial number 9 and the attribute is not readily discernable by examining the merchandise unit 8, the counterfeiter would encounter difficulty in successfully manufacturing a counterfeit merchandise unit 8 having the appropriate properties.

In some embodiments, the comparator 28 provides the serial number 9 as an argument to a function. The resulting value of the function is then compared with the value of the attribute. Or, the comparator 28 can inspect a look-up table keyed to either the serial number itself or to a function that accepts an electronic product code as an input and uses that number as an index to a look-up table. The look-up table can be stored locally, for improved performance. Or, the look-up table can be stored remotely, for example at the central server 18, for enhanced security. Similarly, the evaluation of a function that accepts the serial number and the measured attribute value can take place locally, for enhanced performance, or remotely, at a central server 18, for enhanced security.

For additional security, one can provide two or more marking media, each having an attribute with a relationship to the serial number. A merchandise unit 8 in this case would be deemed authentic only if the values of all the attributes stand in the correct relationship to the serial number.

The invention claimed is:

1. A system for authenticating a merchandise unit, the system comprising:
    a memory for storing an electronic product code obtained from the merchandise unit, the electronic product code identifying the merchandise unit; and
    a sensor for detecting an attribute of a marking medium associated with the merchandise unit;
    the system being configured to output data representative of the attribute and the identity of the merchandise unit.

2. The system of claim 1, further comprising a processor for determining whether the attribute corresponds to the electronic product code.

3. The system of claim 2, wherein the processor is configured to determine whether the attribute corresponds to a range that includes the electronic product code.

4. The system of claim 1, wherein the sensor is configured to detect a physical property of a nucleic acid sequence.

5. The system of claim 1, wherein the sensor comprises a fluorescence detector.

6. The system of claim 1, further comprising a reader configured to read the electronic product code from the merchandise unit.

7. The system of claim 6, wherein the reader comprises an RFID tag reader.

8. The system of claim 6, wherein the reader comprises a bar code scanner.

9. A merchandise unit comprising:
    a mark encoding an electronic product code that identifies the merchandise unit; and
    a marking medium having an attribute that corresponds to the electronic product code.

10. The merchandise unit of claim 9, wherein the mark comprises information encoded as a bar code.

11. The merchandise unit of claim 9, wherein the mark comprises information encoded in an RFID tag.

12. The merchandise unit of claim 9, wherein the marking medium comprises a fluorescent material.

13. The merchandise unit of claim 9, wherein the marking medium comprises a nucleic acid sequence.

14. The merchandise unit of claim 9, wherein the marking medium is associated with packaging of the unit.

15. The merchandise unit of claim 9, wherein the marking medium is associated with labeling of the unit.

16. The merchandise unit of claim 9, wherein the marking medium is associated with a product associated with the unit.

17. A method for evaluating authenticity of a merchandise unit, the method comprising:
    reading an electronic product code from the merchandise unit;
    measuring a value of an attribute associated with the merchandise unit; and
    determining whether the value corresponds to the electronic product code.

18. The method of claim 17, wherein reading an electronic product code comprises reading a bar code.

19. The method of claim 17, wherein reading an electronic product code comprises reading an RFID tag.

20. The method of claim 17, wherein measuring a value comprises observing a fluorescence.

21. The method of claim 17, wherein measuring a value comprises observing a property of a nucleic acid sequence.

22. The method of claim 17, wherein determining whether the value of the attribute corresponds to the electronic product code comprises determining whether the electronic product code is within a range of permissible electronic product codes.

23. A marking system for marking merchandise units, the marking system comprising:
    a marking station having
    a serial number applicator for associating an electronic product code with a merchandise unit; and
    a marking medium applicator for associating a marking medium with the merchandise unit, the marking medium having an attribute that corresponds to the electronic product code associated with the merchandise unit.

24. The system of claim 23, further comprising a processing system in data communication with the marking station for storing, for each merchandise unit marked by the marking station, data indicative of a relationship between the attribute value and the electronic product code.

25. The system of claim 24, wherein the processing system is in data communication with the marking medium applicator over a wide area network.

26. The system of claim 23, wherein the serial number applicator comprises an ink jet printer.

27. The system of claim 23, wherein the marking medium applicator is configured to associate a fluorescent material with a merchandise unit.

28. The system of claim 23, wherein the marking medium applicator is configured to associate a nucleic acid sequence with a merchandise unit.

29. The system of claim 23, wherein the serial number applicator comprises an RFID programming unit.

30. A system comprising a plurality marking systems as recited in claim 23, each of which is in data communication with the processing system over a wide area network.

31. A method for marking a merchandise unit, the method comprising:
   associating an electronic product code with a merchandise unit;
   associating a marking medium with the merchandise unit, the marking medium having an attribute that corresponds to the electronic product code associated with the merchandise unit; and
   storing, for each merchandise unit marked by the marking station, data indicative of a relationship between the attribute value and the electronic product code.

32. The method of claim 31, wherein associating an electronic product code with a merchandise unit comprises encoding the code in an RFID tag.

33. The method of claim 31, wherein associating an electronic product code with a merchandise unit comprises printing the electronic product code on the merchandise unit.

34. The method of claim 31, associating a marking medium with the merchandise unit comprises associating a fluorescent material with a merchandise unit.

35. The method of claim 31, wherein associating a marking medium with the merchandise unit comprises associating a nucleic acid sequence with a merchandise unit.

36. The method of claim 31, wherein storing data comprises transmitting the data to a storage location over a wide area network.

* * * * *